(12) United States Patent
Goebel

(10) Patent No.: US 11,402,833 B2
(45) Date of Patent: Aug. 2, 2022

(54) PROGNOSTICS DRIVEN DECISION MAKING

(71) Applicant: Palo Alto Research Center Incorporated, Palo Alto, CA (US)

(72) Inventor: Kai Goebel, Mountain View, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 0 days.

(21) Appl. No.: 17/104,800

(22) Filed: Nov. 25, 2020

(65) Prior Publication Data
US 2022/0163956 A1    May 26, 2022

(51) Int. Cl.
*G05B 23/02* (2006.01)
*G05B 19/418* (2006.01)

(52) U.S. Cl.
CPC ..... *G05B 23/0283* (2013.01); *G05B 19/4183* (2013.01); *G05B 19/4184* (2013.01); *G05B 19/4188* (2013.01)

(58) Field of Classification Search
CPC ............ G05B 23/0283; G05B 19/4183; G05B 19/4184; G05B 19/4188
See application file for complete search history.

(56) References Cited

U.S. PATENT DOCUMENTS

| 6,861,160 | B2 | 3/2005 | Ando et al. |
| 10,124,893 | B1 | 11/2018 | Aalund et al. |
| 10,814,883 | B1 | 10/2020 | Dixit |
| 11,275,373 | B2 | 3/2022 | Thornberg et al. |
| 2016/0207639 | A1* | 7/2016 | Ellis ................... G06Q 10/0875 |
| 2019/0147412 | A1 | 5/2019 | Chiaramonte et al. |
| 2019/0180527 | A1 | 6/2019 | Segal et al. |
| 2020/0103897 | A1 | 4/2020 | Thornberg et al. |

FOREIGN PATENT DOCUMENTS

| EP | 2972620 | 1/2016 |
| WO | 20140150501 | 9/2014 |

OTHER PUBLICATIONS

Iyer et al., "Framework for Post-Prognostic Decision Support", Proceedings of 2006 IEEE Aerospace Conference, Jan. 10, 2006, pp. 1-10.
European Search Report for EP 21209713.3 issued by the European Patent Office, dated Apr. 21, 2022; 9 pgs.

* cited by examiner

*Primary Examiner* — Manuel A Rivera Vargas
(74) *Attorney, Agent, or Firm* — Mueting Raasch Group

(57) ABSTRACT

Systems and methods include monitoring a health of at least one asset. A remaining useful life (RUL) of the at least one asset is estimated based on the monitoring. The RUL of the asset is categorized into categories comprising shorter than a time to complete a current mission and longer than the time to complete the current mission. One or more remedial actions are automatically performed during the current mission if the RUL is categorized as being less than the time to complete the current mission. The remedial actions comprise one or more of initiating a fail-safe mode, adapting a controller of the one or more assets, reconfiguration of the system, and adjusting the current mission of the one or more assets. Maintenance is scheduled for after the current mission of the at least one asset if the RUL is categorized as being greater than or equal to the time to complete the current mission.

22 Claims, 7 Drawing Sheets

PROGNOSTICS DRIVEN DECISION MAKING

BACKGROUND

Prognostic estimation can be useful to estimate the remaining useful life of various types of equipment. Remaining useful life estimates allow equipment operators to make informed decisions about determining appropriate remedial actions

SUMMARY

Embodiments involve a method comprising monitoring a health of at least one asset. A remaining useful life (RUL) of the at least one asset is estimated based on the monitoring. The RUL of the asset is categorized into categories comprising shorter than a time to complete a current mission and longer than the time to complete the current mission. One or more remedial actions are automatically performed during the current mission if the RUL is categorized as being less than the time to complete the current mission. The remedial actions comprise one or more of initiating a fail-safe mode, adapting a controller of the one or more assets, reconfiguration of the system, and adjusting the current mission of the one or more assets. Maintenance is scheduled for after the current mission of the at least one asset if the RUL is categorized as being greater than or equal to the time to complete the current mission.

Embodiments involve a system, comprising a processor and a memory storing computer program instructions which when executed by the processor cause the processor to perform operations. The operations comprise monitoring a health of at least one asset. A remaining useful life (RUL) of the at least one asset is estimated based on the monitoring. The RUL of the asset is categorized into categories comprising shorter than a time to complete a current mission and longer than the time to complete the current mission. One or more remedial actions are automatically performed during the current mission if the RUL is categorized as being less than the time to complete the current mission. The remedial actions comprise one or more of initiating a fail-safe mode, adapting a controller of the one or more assets, reconfiguration of the system, and adjusting the current mission of the one or more assets. Maintenance is scheduled for after the current mission of the at least one asset if the RUL is categorized as being greater than or equal to the time to complete the current mission.

Embodiments involve a non-transitory computer readable medium storing computer program instructions, the computer program instructions when executed by a processor cause the processor to perform operations. The operations comprise monitoring a health of at least one asset. A remaining useful life (RUL) of the at least one asset is estimated based on the monitoring. The RUL of the asset is categorized into categories comprising shorter than a time to complete a current mission and longer than the time to complete the current mission. One or more remedial actions are automatically performed during the current mission if the RUL is categorized as being less than the time to complete the current mission. The remedial actions comprise one or more of initiating a fail-safe mode, adapting a controller of the one or more assets, reconfiguration of the system, and adjusting the current mission of the one or more assets. Maintenance is scheduled for after the current mission of the at least one asset if the RUL is categorized as being greater than or equal to the time to complete the current mission.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
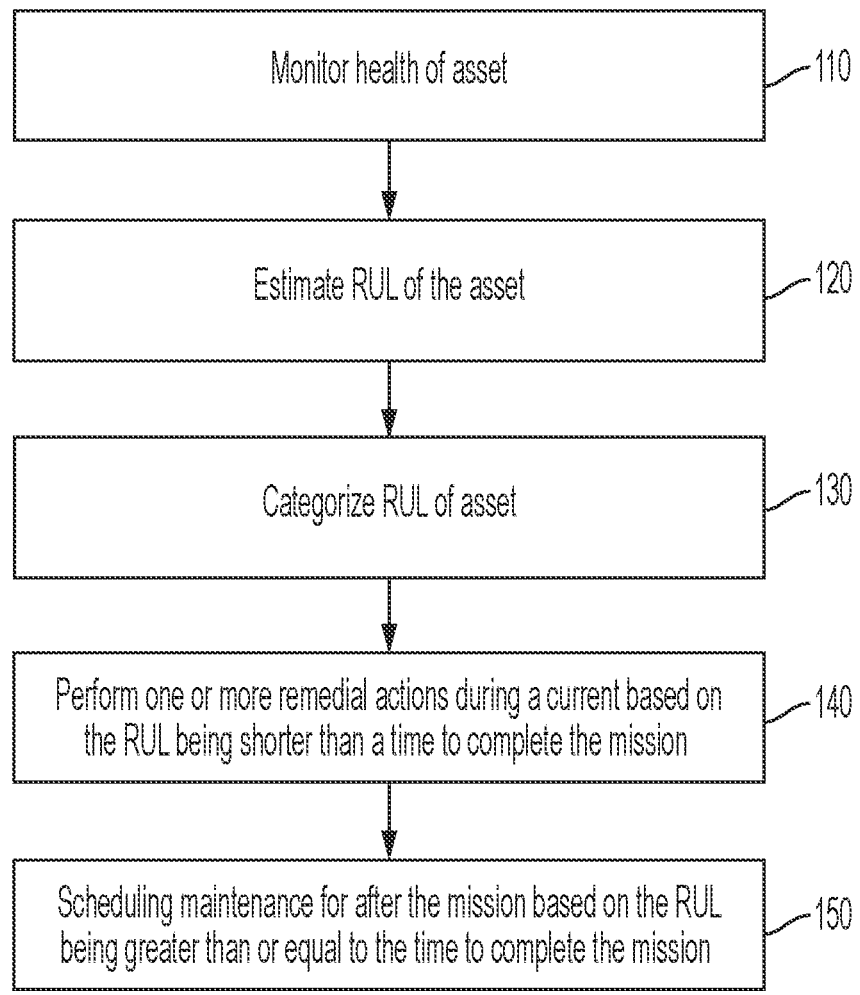
FIG. 1 illustrates a method for determining one or more remedial actions to take based on the RUL in accordance with the embodiments described herein.

The approaches described herein relate to the field of making predictions based on a remaining useful life (RUL) for some type of component, e.g., pump, valve, transformer, engine, medical system, structural member, battery, etc. All equipment undergoes degradation and will eventually fail, if no remedial action is being taken. Such predictions are particularly important in the field of Prescriptive maintenance (RxM) where this predictive information is used to provide the decision that ensures minimal operational disruption, thereby saving cost compared to unscheduled, reactive maintenance. For example, if the predicted RUL (i.e., the time to failure) is just a few milliseconds away, scheduling maintenance may not be the appropriate response. Instead, the system may be configured to reflexively protect itself and then deal with restoring functionality later. However, if the prognosis is that the asset will fail in 3 weeks, for example, then there may be enough time to put in motion a maintenance action that helps to remediate the problem. Embodiments described herein involve determining one or more actions to take based on the predicted RUL.

A system can have many subsystems and components that are used in a mission to carry out their respective function. They experience degradation based on usage and may furthermore experience faults which is manifested as a sudden change in the subsystem's or component's health trajectory. These faults have a stochastic nature and can happen at any time. The prior probability of fault occurrence is typically known, but not the time at which they occur. The remaining life drops faster when a fault is present compared to when no fault is present. Depending on the nature of the fault, and the time to failure (which the prognostics estimates as remaining useful life), different action should be taken. If the fault causes RUL to drop to a point where failure is imminent, the system may reflexively protect itself and go into fail-safe mode. This may come at the expense of operational readiness but safeguards the larger mission goals. The system may be configured to return the asset to full status if possible with appropriate remedial action. Such remedial action may include maintenance.

If RUL is larger than the point that failure is imminent, but still does not allow for maintenance action, then, depending on the prognostic horizon, system reconfiguration may be appropriate. System reconfiguration may involve using directly or indirectly redundant subsystems that can at least partially restore operational capability. Reconfiguration can be accomplished for various types of systems, including, mechanical, electrical, or other types. The degree to which this type of reconfiguration can be accomplished depends on the modularity and the architecture of the system. For complex systems, finding partial and indirect redundancies may be found be examining a large number of potential configurations and compare the expected function.

Another feasible reconfiguration may be controller adaptation. Controller adaptation can involve changes of gains or changing other controller settings. It has the goal of relieving some stress on the component and should ideally result in restoration of some extra life. Finding the appropriate settings can be a complicated task, depending on the complexity of the controls. One way to address this task is to explore different controls settings from a bank of controllers. Another way would be to carry out an optimization of controls settings where the objective function encapsulates the restoration of remaining life as well as meeting mission objectives, amongst other things. Larger RUL may allow modification of mission plans to address the lack of availability of a particular subsystem (which may be temporary). Replanning or rescheduling of tasks is a search or optimization problem and typically requires more time, depending on the complexity of the overall mission. Mission replanning results in reduced use of the impaired component (if may be taken completely out of commission). If possible, the impaired component should be repaired.

Finally, if RUL is even larger, maintenance can be scheduled while taking into consideration various operational and logistics constraints. Typically, many competing objectives need to be considered to optimally address this task. This includes minimal impact on operational objectives, least costly repair, least downtime, best utilization of repair facilities, possible impact on secondary objectives (such as shop loading), etc.

Maintenance action is performed based on the recommendation of the maintenance optimization tool and—if no maintenance was recommended at the time—based on criticality of the remaining life estimate. That is, a component may experience drop in remaining life even when no fault caused a sudden drop. To prevent the component from failing, it may be scheduled to be fixed.

FIG. 1 illustrates a method for determining one or more remedial actions to take based on the RUL in accordance with the embodiments described herein. The health of at least one asset is monitored 110 via one or more sensors, for example. According to various configurations, the health of the asset may be monitored continuously. In some cases, the health of the asset may be monitored at predetermined discrete intervals. According to various embodiments, the health of the asset may be monitored based on a previously predicted RUL. According to various implementations, it may be determined if a fault of the one or more assets has occurred based on the monitoring.

The RUL of the at least one asset may be estimated 120 based on the monitoring. For example, the RUL may be based on an estimate of the future damage to the component. The estimators may employ fundamentally different approaches to provide the future damage estimates of the component. For example, one or more estimators may operate from first principles of the physics of the system and/or fault propagation for given operating and environmental conditions to provide the future damage estimates. Alternatively or additionally, one or more estimators may operate from models based on empirical data gained through performing a number of experiments to provide the future damage estimates or from having collected trajectories of data relating to past failures. Predicting the RUL of an asset is described in more detail in commonly owned U.S. application Ser. No. 16/717,649, which is herein incorporated by reference in its entirety.

The RUL of the at least one asset may be categorized 130 based on a length of the RUL. For example, the RUL may be categorized into a time shorter than a time to complete a current mission and a time longer to complete the current mission. It is to be understood that the term "mission" can refer to a mission comprising subtasks and/or could be considered a subtask. In general, the mission is a goal driven activity which could be as diverse as the flight of an aircraft or the processing of materials in a manufacturing plant.

One or more remedial actions may be automatically performed 140 during the current mission if the RUL is categorized as being shorter than the time to complete the current mission. Maintenance may be scheduled 150 for after the current mission of the at least one asset if the RUL is categorized as being longer than the time to complete the current mission. According to embodiments described herein maintenance may include any action that seeks to uphold or improve the health of an asset. For example, the maintenance may include one or more of repair, replacement, refurbishment, restoration, cleaning, lubrication, etc.

According to various embodiments, the one or more remedial actions comprise one or more of initiating a fail-safe mode, adapting a controller of the one or more assets (e.g., adjusting one or more controller settings), reconfiguration of the system and adjusting the current mission of the one or more assets. According to various configurations, adjusting the current mission includes replanning and/or rescheduling one or more mission tasks. Replanning the one or more mission tasks may include changing an order in which mission tasks are completed and/or eliminating one or more unnecessary mission tasks, for example.

The RUL may be categorized into any number of categories. For example, the RUL may be categorized into a first, second, third, and fourth category. The RUL may be categorized into the first category if remaining RUL is less than or equal to a first threshold, a second category if remaining RUL is greater than the first threshold and less than or equal to a second threshold, categorizing the RUL of the at least one asset into the third category if remaining RUL is greater than the second threshold and less than or equal to a third threshold, and categorizing the RUL of the at least one asset into the fourth category if remaining RUL is greater than the third threshold. One or more of the first, second and third thresholds may be tunable based on a current mission, for example. In some cases, one or more of the first, second, and third thresholds are set by a user. According to various implementations, at least one of the first, second, and third thresholds are determined automatically based on the current mission and/or one or more mission tasks.

Figure 2:
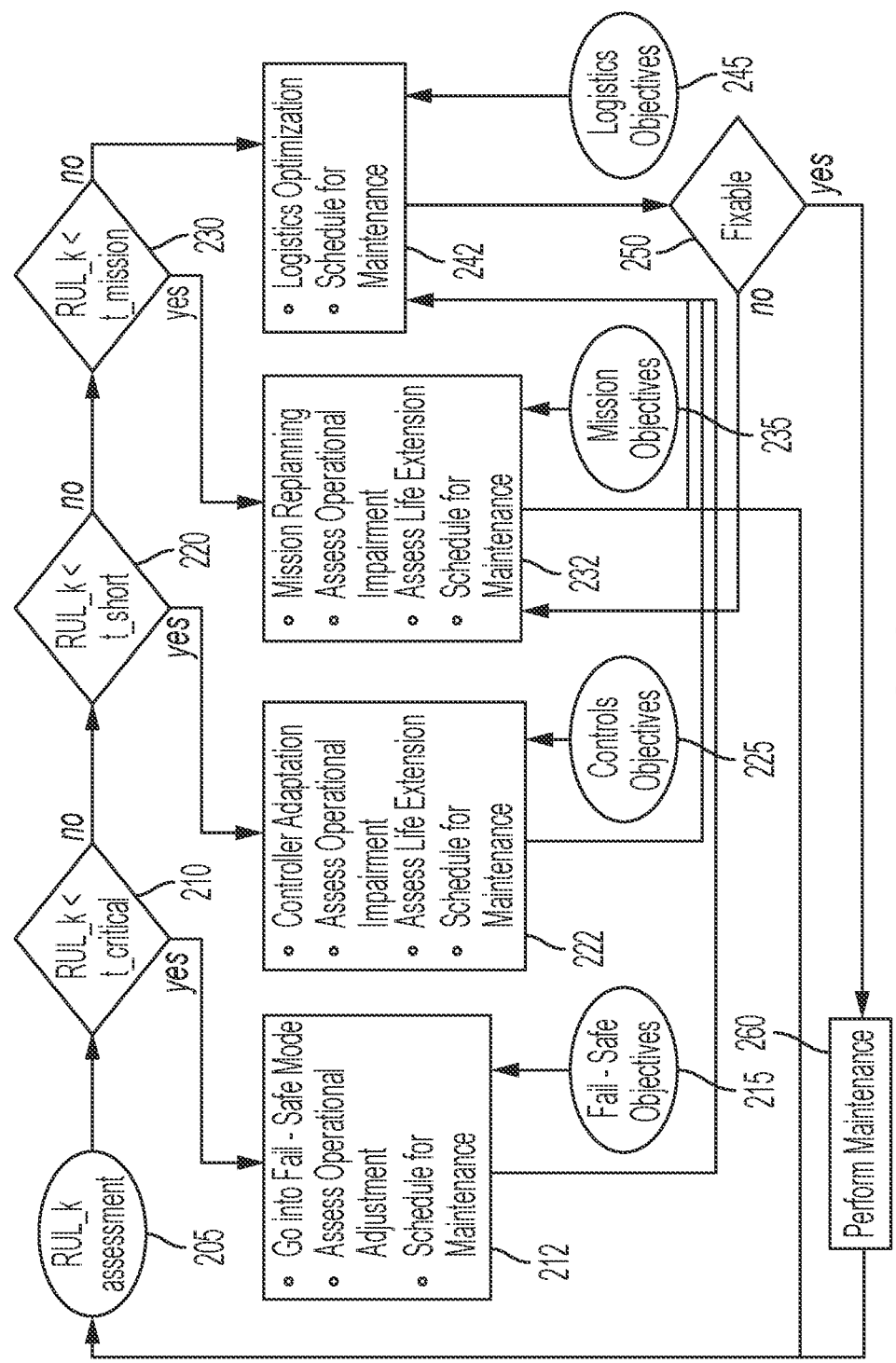
FIG. 2 shows a more detailed flow diagram for determining one or more remedial actions to take based on the RUL in accordance with the embodiments described herein.

FIG. 2 shows a more detailed flow diagram for determining one or more remedial actions to take based on the RUL in accordance with the embodiments described herein. A systems health unit 201 monitors the health of an asset k, determines the presence of a fault, and estimates 205 remaining life RUL_k. If it is determined 210 RUL_k is very small, say, RUL_k<t_critical, then the system may protect itself by going into fail-safe mode 212, for example. According to various implementations, the impact of the fail-safe mode on other operational goals is assessed and a plan for returning from fail-safe mode may be made. Such a plan may involve a maintenance action to repair and/or replace the item or other appropriate action. The fail-safe mode may be configured to trade off functionality of the faulted component with protection of other mission objectives. The fail-safe action disengages the remaining life clock and allows for more time to remediate the problem. One or more fail-safe objectives 215 may be considered. These objectives may be pre-compiled to allow to fastest protection in case of the fault. Should the fault not be fixable, then the mission may be replanned to account for the loss of functionality imposed by the fault of the particular component.

If it is determined 220 that the remaining life is still small, but not as small as t_critical, say, RUL_k<t_short, the system may be able to issue controller adaptation as a remedial action. According to various embodiments, t_short is a tunable parameter based on operational and mission constraints), then the system may be able to issue controller adaptation 222 as a remedial action. Controller adaptation in itself may be a complicated task, based on the complexity of the asset and based on adaptation objectives 225 for the particular asset that in the context of a controller are controls objectives. It can be framed as an optimization problem that is subject to time constraints (namely RUL_k). The outcome of the controller adaptation is typically not fixing the problem with the asset, but results in a life extension of the asset. The fault may still be addressed through maintenance, but the controller adaptation buys additional time by shedding load from the faulted component, for example.

Alternative to controller adaptation, system reconfiguration can be used as a remedial action. System reconfiguration involves using directly or indirectly redundant subsystems that at least partially restore operational capability. Reconfiguration can be accomplished for various types of systems, including, mechanical, electrical, or other types. For complex systems, finding partial and indirect redundancies is found by examining a large number of potential configurations and compare the expected function and is framed as an optimization problem subject to adaptation objectives. In the context of the system reconfiguration, the adaptation objectives are an objective function that encapsulates the operational capabilities of the system.

Again, if the problem is not fixable, the mission may be replanned to account for the loss of functionality of that particular component.

If it is determined 230 that the remaining time is larger still, but not large enough to allow for cost efficient and safe maintenance, (so RUL_k<t_mission, for example) then a mission replanning module 232 may get triggered. This module 232 uses the mission objectives to assess operational impairment in light of the faulted component. New mission plans are evaluated such as to maximize the mission objectives 235 with new component availability and readiness. Such a planning activity is an optimization task for which a large number of approaches exist, including various search algorithms and other task allocation algorithms (amongst others). Such an action allows for operations to continue in an optimal fashion (given the available asset mix) while more permanent remediation is being pursued, possibly through maintenance and/or repair.

Finally, if it is determined that RUL_k is even larger such that RUL_k≥t_mission—and while other measures with shorter RUL_k have been invoked—the maintenance optimization module 242 is triggered. Here, the optimal maintenance action is being evaluated while considering also logistics objectives 245. It may be determined 250 if the asset and/or the asset component is fixable. If it is determined 250 that the asset and/or the asset component is not fixable, the mission replanning module 232 may be invoked. If it is determined 250 that the asset and/or the asset component is fixable, the asset and/or the asset component may be scheduled for maintenance 260 after completion of the current mission.

Determining the optimal maintenance action may be considerable, potentially reaching back to manufacturing of the item, but also needs to be seen in context of the needs of other assets, in particular in the fleet setting where more than one asset needs to be operated. In such a case, many demands on logistics will compete for resources with the asset at hand and the problem can be interpreted as a large scale dynamic multi-objective optimization problem. Again, many approaches to solving this problem are available. The multi-objective nature of the problem means that a plurality of solutions will be produced that still necessitates the down-select of a suitable solution. This is often times done in collaboration with human operators which employ non-encoded context constraints for the final solution. Alternatively or additionally, the problem can be collapsed into a single-objective problem by assigning weights to the different objectives. In that case, a unique solution can be found and pursued.

Figure 3:
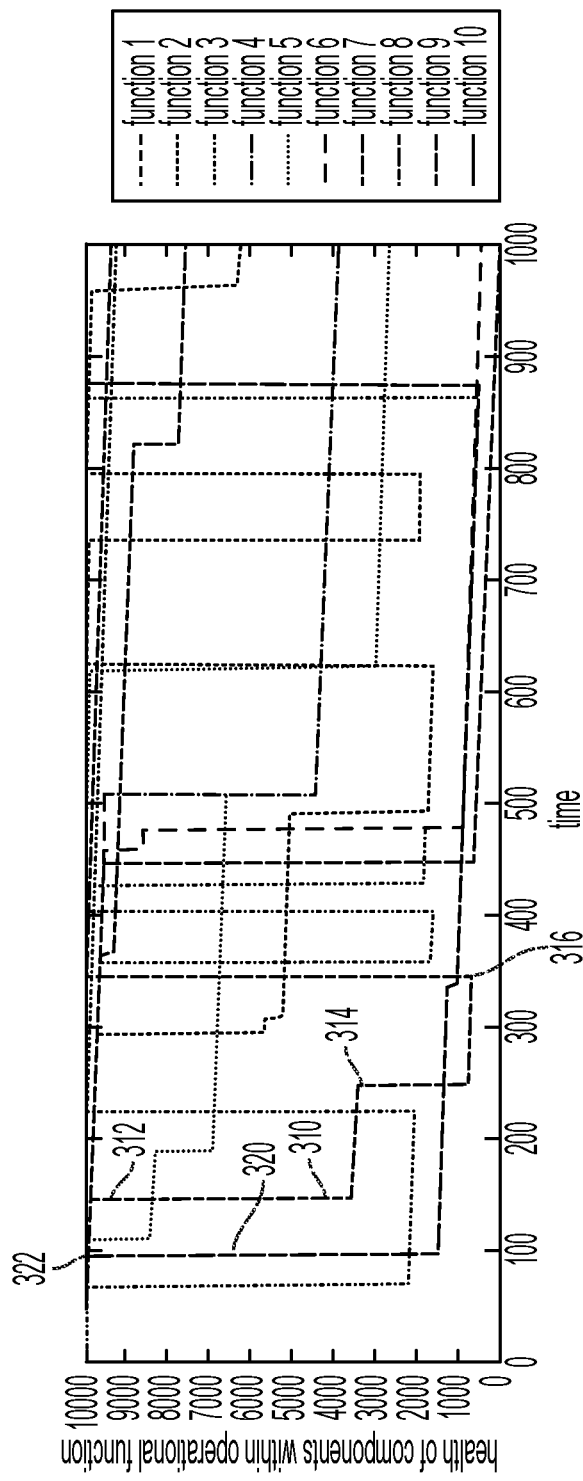
FIG. 3 shows an example results of a simulation of a hypothetical asset with ten subsystems/components that fail at various times with different RUL values in accordance with the embodiments described herein.

FIG. 3 shows an example result of simulation of a hypothetical asset with k=10 subsystems/components that fail at various times with different RUL_k. As can be observed, depending on the remaining time of the component, the result of the system's actions restores component health after a fault, but not necessarily immediately. For example, subsystem 1 310 has a drop in RUL at time 312 and another drop in RUL at time 314. Subsystem 1 310 is then repaired at time 316. Subsystem 7 320 has a large drop in RUL at time 322 before the any drops in RUL for Subsystem 1 310. Subsystem 2 320 does not get repaired until time 324, well after subsystem 1 310 has been repaired.

Figure 4:
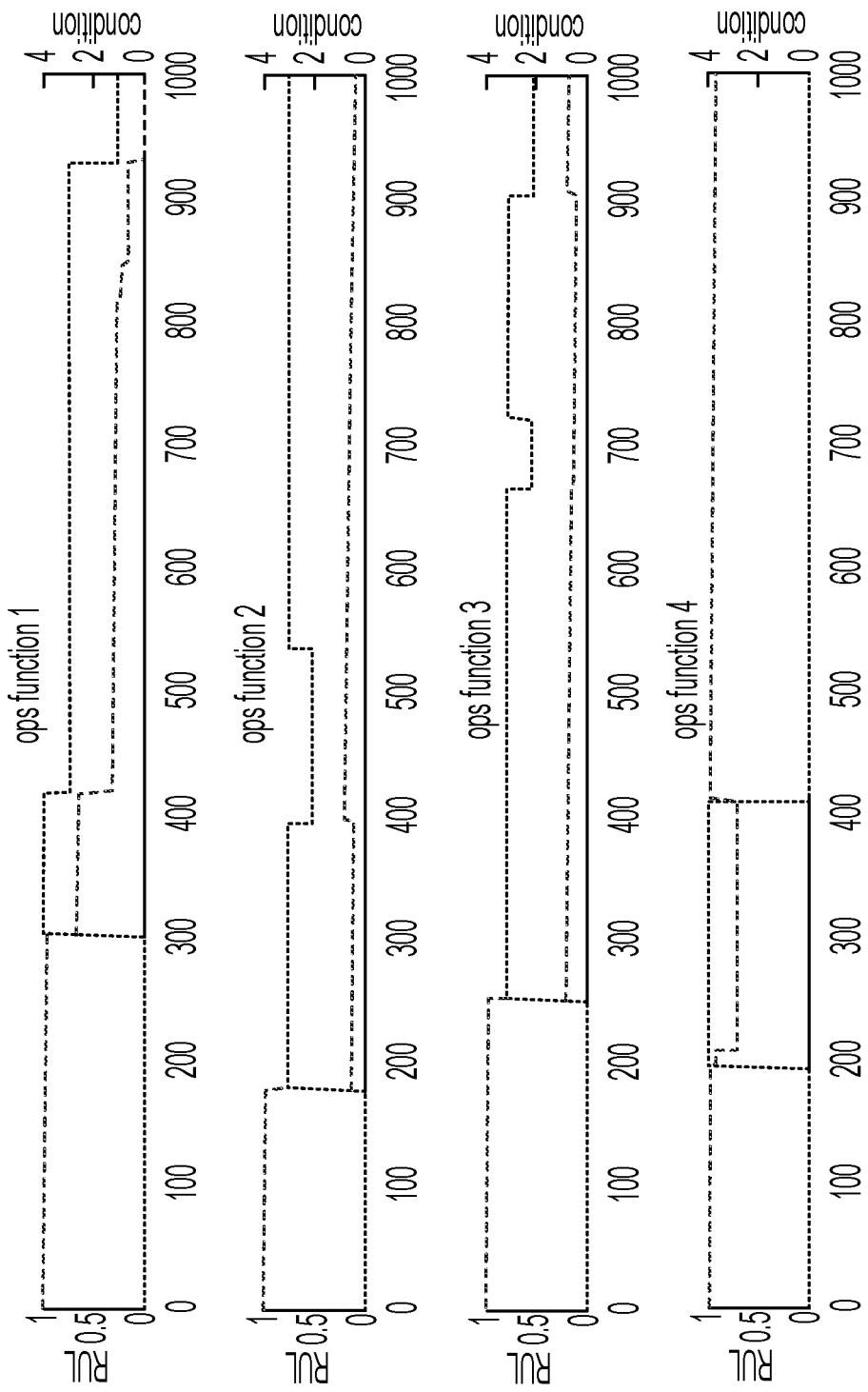
FIG. 4 shows a more detailed view on a component by component basis where each component is represented by a RUL and an operational condition in accordance with the embodiments described herein.
Figure 4:
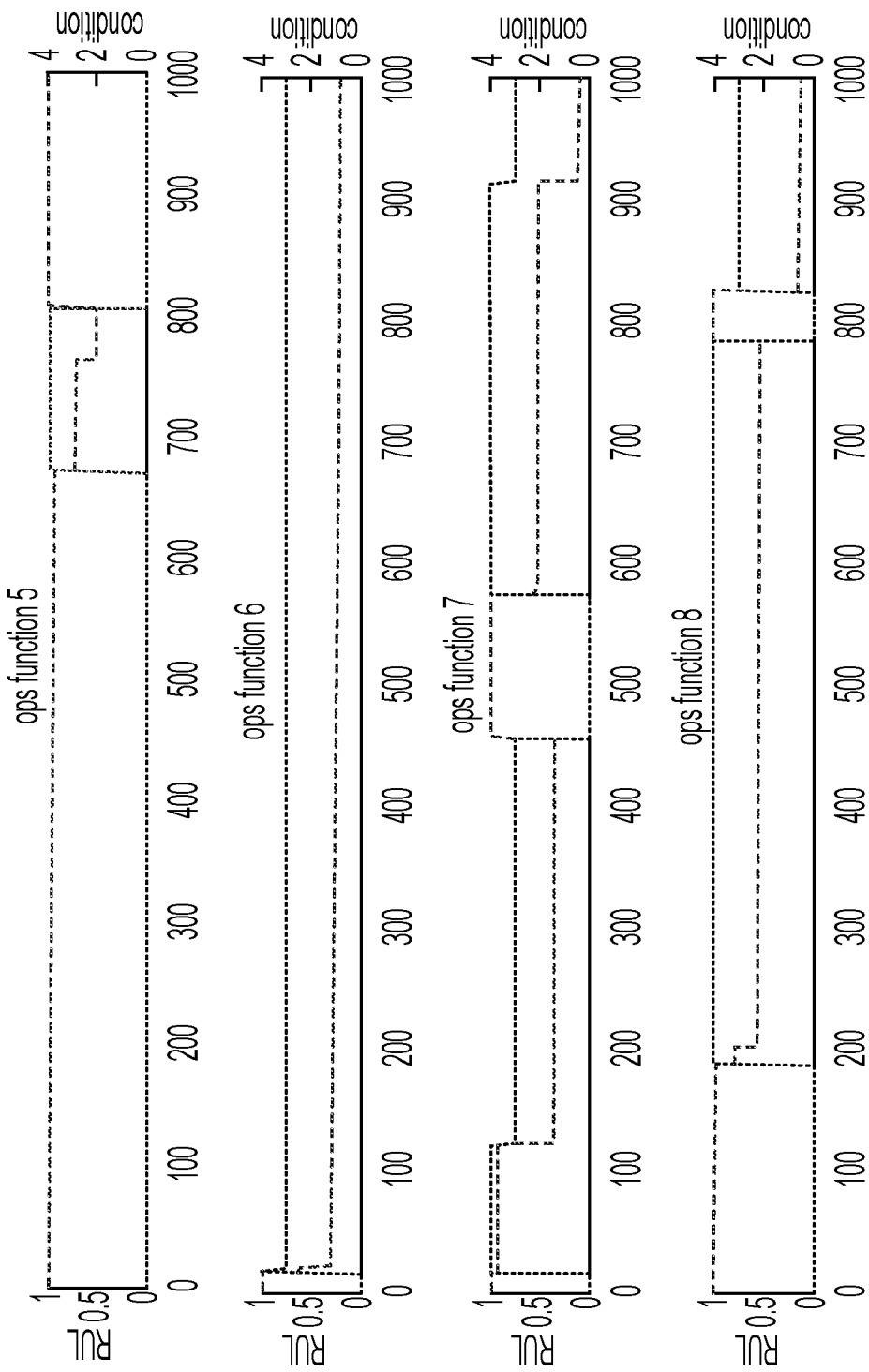
Figure 4:
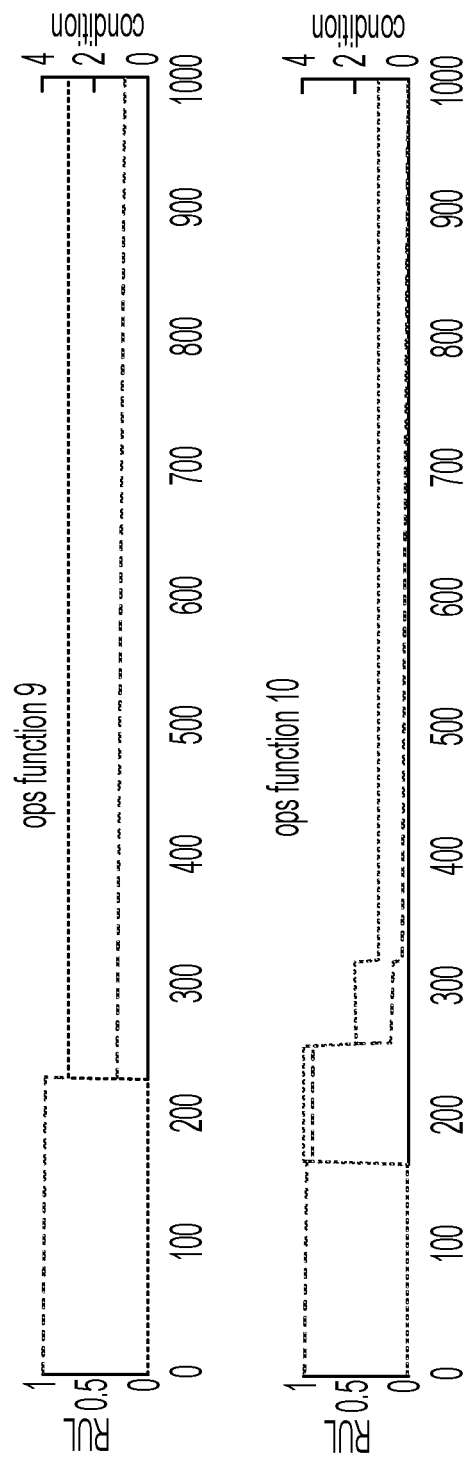

FIG. 4 shows a more detailed view on a component by component basis where each component is represented by a RUL (in blue) and an operational condition. For illustrative purposes, the operational condition is zero if there is no fault. Note that the component may still experience degradation, which is considered normal. The operational condition is "1" if the system has to go into fail-safe mode. It is "2" if the system goes into controller adaptation mode and it is "3" if it goes into mission replanning mode, and it is "4" if it goes into maintenance mode as shown in Table 1.

TABLE 1

| Operational Modes | |
| --- | --- |
| Operational mode | Code |
| Normal | 0 |
| Fail-Safe Mode | 1 |
| Controller Adaptation or System Reconfiguration | 2 |
| Mission Re-Planning | 3 |
| Maintenance | 4 |

As can be observed, different actions are taken for the different situations, reflecting the policies and objectives for the different modes and faults. The remedial actions taken may be dependent on preferences that may be expressed in the various objectives for the different components, namely fail-safe objective, controls objectives, mission objectives, and/or logistics objectives.

Figure 5:
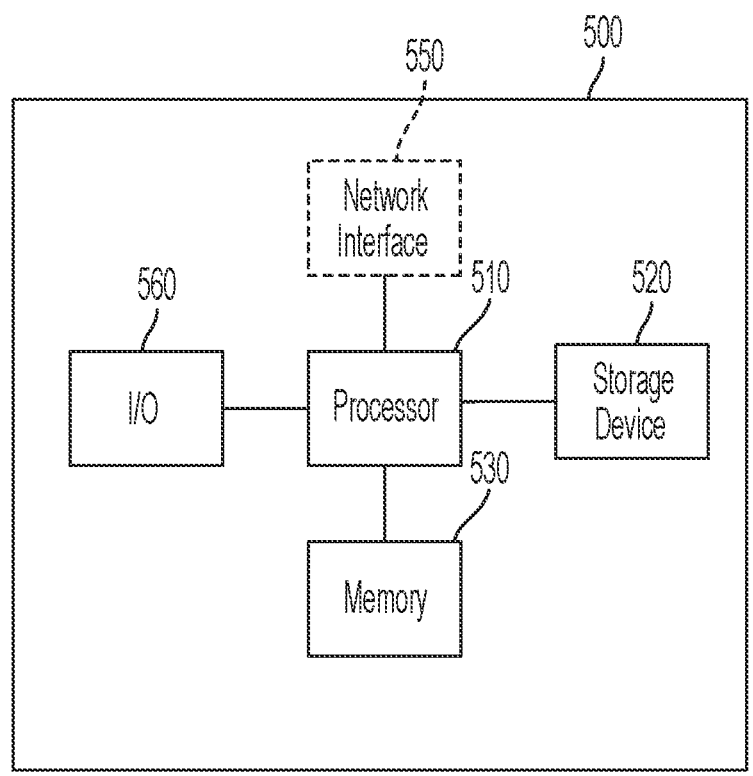
FIG. 5 shows a block diagram of a system capable of implementing embodiments described herein.

The above-described methods can be implemented on a computer using well-known computer processors, memory units, storage devices, computer software, and other components. A high-level block diagram of such a computer is illustrated in FIG. 5. Computer 500 contains a processor 510, which controls the overall operation of the computer 500 by executing computer program instructions which define such operation. The processor may use sensor information obtained from one or more sensors. It is to be understood that the processor 510 can include any type of device capable of executing instructions. For example, the processor 510 may include one or more of a central processing unit (CPU), a graphical processing unit (GPU), a field-programmable gate array (FPGA), and an application-specific integrated circuit (ASIC). The computer program instructions may be stored in a storage device 520 (e.g., magnetic disk) and loaded into memory 530 when execution of the computer program instructions is desired. Thus, the steps of the methods described herein may be defined by the computer program instructions stored in the memory 530 and controlled by the processor 510 executing the computer program instructions. According to various implementations, the computer may perform method steps as part of an in-house server or cloud based service. The computer 500 may include one or more network interfaces 550 for communicating with other devices via a network. The computer 500 also includes other input/output devices 560 that enable user interaction with the computer 500 (e.g., display, keyboard, mouse, speakers, buttons, etc.). According to various embodiments, FIG. 5 is a high level representation of possible components of a computer for illustrative purposes and the computer may contain other components.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate ink jet ejector diagnostics as described above.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. A method comprising:
monitoring a health of at least one asset;
estimating a remaining useful life (RUL) of the at least one asset based on the monitoring;
categorizing the RUL of the asset into categories comprising shorter than a time to complete a current mission and longer than the time to complete the current mission;
automatically performing one or more remedial actions during the current mission if the RUL is categorized as being less than the time to complete the current mission, the one or more remedial actions selected from initiating a fail-safe mode, adapting a controller of the one or more assets, reconfiguration of the system, and adjusting the current mission of the one or more assets; and
scheduling maintenance for after the current mission of the at least one asset if the RUL is categorized as being greater than or equal to the time to complete the current mission.

2. The method of claim 1, further comprising:
determining if a fault of the one or more assets have occurred based on the monitoring; and
categorizing the RUL of the asset into categories based on the determination that a fault has occurred.

3. The method of claim 1, wherein categorizing the RUL into categories comprises categorizing the RUL of the asset into at least a first category, a second category, a third category and a fourth category based on the remaining RUL.

4. The method of claim 3, wherein categorizing the RUL into categories comprises:
categorizing the RUL of the at least one asset into the first category if remaining RUL is less than or equal to a first threshold;
categorizing the RUL of the at least one asset into the second category if remaining RUL is greater than the first threshold and less than or equal to a second threshold;
categorizing the RUL of the at least one asset into the third category if remaining RUL is greater than the second threshold and less than or equal to a third threshold; and
categorizing the RUL of the at least one asset into the fourth category if remaining RUL is greater than the third threshold.

5. The method of claim 4, wherein at least one of the first threshold, the second threshold, and the third threshold are tunable.

6. The method of claim 4, wherein the third threshold is based on the time to complete the current mission.

7. The method of claim 4, further comprising:
initiating a fail-safe mode if the RUL is categorized as being in the first category;
adapting a controller of the one or more assets if the RUL is categorized as being in the second category;
reconfiguring a system comprising of the one or more assets if the RUL is categorized as being in the second category;
adjusting the current mission of the one or more assets if the RUL is categorized as being in the third category; and scheduling maintenance for after completion of the current mission if the RUL is categorized as being in the fourth category.

8. The method of claim 7, wherein adapting the controller of the one or more assets comprises adjusting one or more controller settings.

9. The method of claim 7, wherein reconfiguring the one or more assets comprises one or more partially direct or indirect redundancies.

10. The method of claim 7, wherein adjusting the current mission comprises one or more of replanning and rescheduling one or more mission tasks.

11. A system, comprising:
a processor; and
a memory storing computer program instructions which when executed by the processor cause the processor to perform operations comprising:
monitoring a health of at least one asset;
estimating a remaining useful life (RUL) of the at least one asset based on the monitoring;
categorizing the RUL of the asset into categories comprising shorter than a time to complete a current mission and longer than the time to complete the current mission;
automatically performing one or more remedial actions during the current mission if the RUL is categorized as being less than the time to complete the current mission, the one or more remedial actions selected from initiating a fail-safe mode, adapting a controller of the one or more assets, reconfiguration of the system, and adjusting the current mission of the one or more assets; and
scheduling maintenance for after the current mission of the at least one asset if the RUL is categorized as being greater than or equal to the time to complete the current mission.

12. The system of claim 11, further comprising:
determining if a fault of the one or more assets have occurred based on the monitoring; and
categorizing the RUL of the asset into categories based on the determination that a fault has occurred.

13. The system of claim 11, wherein categorizing the RUL into categories comprises categorizing the RUL of the asset into at least a first category, a second category, a third category and a fourth category based on the remaining RUL.

14. The system of claim 13, wherein categorizing the RUL into categories comprises:
categorizing the RUL of the at least one asset into the first category if remaining RUL is less than or equal to a first threshold;
categorizing the RUL of the at least one asset into the second category if remaining RUL is greater than the first threshold and less than or equal to a second threshold;
categorizing the RUL of the at least one asset into the third category if remaining RUL is greater than the second threshold and less than or equal to a third threshold; and
categorizing the RUL of the at least one asset into the fourth category if remaining RUL is greater than the third threshold.

15. The system of claim 14, wherein at least one of the first threshold, the second threshold, and the third threshold are tunable.

16. The system of claim 14, wherein the third threshold is based on the time to complete the current mission.

17. The system of claim 14, further comprising:
initiating a fail-safe mode if the RUL is categorized as being in the first category;
adapting a controller of the one or more assets if the RUL is categorized as being in the second category;
reconfiguring a system using direct or indirect redundancies if the RUL is categorized in the second category
adjusting the current mission of the one or more assets if the RUL is categorized as being in the third category; and
scheduling maintenance for after completion of the current mission if the RUL is categorized as being in the fourth category.

18. The system of claim 17, wherein adapting the controller of the one or more assets comprises adjusting one or more controller settings.

19. The system of claim 17, wherein reconfiguring the system of the one or more assets comprises one or more partially direct or indirect redundancies.

20. The system of claim 17, wherein adjusting the current mission comprises one or more of replanning and rescheduling one or more mission tasks.

21. A non-transitory computer readable medium storing computer program instructions, the computer program instructions when executed by a processor cause the processor to perform operations comprising:
monitoring a health of at least one asset;
estimating a remaining useful life (RUL) of the at least one asset based on the monitoring;
categorizing the RUL of the asset into categories comprising shorter than a time to complete a current mission and longer than the time to complete the current mission;
automatically performing one or more remedial actions during the current mission if the RUL is categorized as being less than the time to complete the current mission, the one or more remedial actions selected from initiating a fail-safe mode, adapting a controller of the one or more assets, reconfiguration of the mission, and adjusting the current mission of the one or more assets; and
scheduling maintenance for after the current mission of the at least one asset if the RUL is categorized as being greater than or equal to the time to complete the current mission.

22. The non-transitory computer readable medium of claim 21, further comprising:
determining if a fault of the one or more assets have occurred based on the monitoring; and
categorizing the RUL of the asset into categories based on the determination that a fault has occurred.

* * * * *